US012622541B2

(12) United States Patent
Cao et al.

(10) Patent No.: US 12,622,541 B2
(45) Date of Patent: May 12, 2026

(54) DETACHABLE CARPET

(71) Applicant: KUNSHAN YIJIA JU TEXTILE CO., LTD., Suzhou (CN)

(72) Inventors: Shunlin Cao, Suzhou (CN); Yi Zhang, Suzhou (CN); Zixiang Zhai, Suzhou (CN); Yuhao Sun, Suzhou (CN)

(73) Assignee: KUNSHAN YIJIA JU TEXTILE CO., LTD., Suzhou (CN)

( * ) Notice: Subject to any disclaimer, the term of this patent is extended or adjusted under 35 U.S.C. 154(b) by 0 days.

(21) Appl. No.: 18/727,114

(22) PCT Filed: Jul. 4, 2022

(86) PCT No.: PCT/CN2022/103555
§ 371 (c)(1),
(2) Date: Jul. 8, 2024

(87) PCT Pub. No.: WO2023/216400
PCT Pub. Date: Nov. 16, 2023

(65) Prior Publication Data
US 2025/0072642 A1 Mar. 6, 2025

(30) Foreign Application Priority Data

May 11, 2022 (CN) .......................... 202221122673.0

(51) Int. Cl.
*A47G 27/04* (2006.01)
*B32B 5/02* (2006.01)
*B32B 7/12* (2006.01)

(52) U.S. Cl.
CPC .......... *A47G 27/0412* (2013.01); *B32B 5/024* (2013.01); *B32B 7/12* (2013.01); *B32B 2471/02* (2013.01)

(58) Field of Classification Search
CPC ........... A47G 27/0412; A47G 27/0225; A47G 27/04; B32B 5/024; B32B 5/26;
(Continued)

(56) References Cited

U.S. PATENT DOCUMENTS 3,718,725 A     2/1973 Hamano
4,530,870 A  *  7/1985 Brazier .............. A47G 27/0412
                                                            428/95
(Continued)

FOREIGN PATENT DOCUMENTS

CN         204970740 U     1/2016
CN         206414124 U     8/2017
(Continued)

*Primary Examiner* — William L Miller
(74) *Attorney, Agent, or Firm* — Bayramoglu Law Offices

(57) ABSTRACT

A detachable carpet is provided. The detachable carpet includes a carpet surface layer and an adhesive anti-skid layer, and the carpet surface layer and the adhesive anti-skid layer are detachably connected. The carpet surface layer includes a surface layer and a sticky layer, and the surface layer is arranged at a top end of the carpet surface layer. Bent protruded monofilaments are distributed on a lower surface of the sticky layer, and lumps are formed at the tops of the monofilaments after the monofilaments are melted/softened. The adhesive anti-skid layer includes a hooking surface layer and an anti-skid layer, and the anti-skid layer is arranged at a bottom of the adhesive anti-skid layer. After the protruded monofilaments on the lower surface of the sticky layer are subjected to thermal treatment, the top ends of the protruded monofilaments are melted/softened to form small lumps.

10 Claims, 2 Drawing Sheets

(58) Field of Classification Search
 CPC B32B 5/022; B32B 3/06; B32B 3/085; B32B 7/12; B32B 7/06; B32B 2471/02; B32B 2255/02; B32B 2255/26; B32B 2307/748
 See application file for complete search history.

(56) References Cited

U.S. PATENT DOCUMENTS

| | | | | |
|---|---|---|---|---|
| 4,822,658 A * | 4/1989 | Pacione | A47G 27/0437 | |
| | | | 428/95 | |
| 5,380,574 A * | 1/1995 | Katoh | B60N 3/048 | |
| | | | 428/95 | |
| 5,382,462 A * | 1/1995 | Pacione | A44B 18/00 | |
| | | | 428/95 | |
| 5,753,336 A * | 5/1998 | Stull | B32B 27/06 | |
| | | | 238/14 | |
| 6,306,477 B1 * | 10/2001 | Pacione | E04F 13/0882 | |
| | | | 428/95 | |
| 6,855,221 B1 * | 2/2005 | Lepsius | B32B 27/304 | |
| | | | 156/289 | |
| 7,341,773 B1 * | 3/2008 | Schulte | A47G 27/0437 | |
| | | | 428/95 | |
| 10,024,056 B2 * | 7/2018 | Pacione | E04F 15/02138 | |
| 11,950,720 B2 * | 4/2024 | Cao | B32B 27/308 | |
| 2013/0267141 A1 * | 10/2013 | Yang | B32B 27/40 | |
| | | | 428/317.1 | |
| 2015/0064388 A1 | 3/2015 | Beyda | | |
| 2021/0393064 A1 * | 12/2021 | Cao | D04B 21/04 | |
| 2022/0064830 A1 | 3/2022 | Shun Lin | | |
| 2024/0315475 A1 * | 9/2024 | Cao | B32B 7/06 | |
| 2025/0134291 A1 * | 5/2025 | Cao | B32B 27/12 | |
| 2025/0221558 A1 * | 7/2025 | Du | B32B 5/022 | |
| 2025/0366645 A1 * | 12/2025 | Huang | B32B 3/085 | |

FOREIGN PATENT DOCUMENTS

| | | | | | |
|---|---|---|---|---|---|
| CN | 110393413 A | | 11/2019 | | |
| CN | 110421913 A | * | 11/2019 | | B32B 5/26 |
| CN | 209932326 U | | 1/2020 | | |
| CN | 210672975 U | | 6/2020 | | |
| CN | 210679909 U | * | 6/2020 | | |
| CN | 210679971 U | | 6/2020 | | |
| CN | 212234057 U | | 12/2020 | | |
| CN | 214395763 U | | 10/2021 | | |
| CN | 113598588 A | | 11/2021 | | |
| CN | 113842017 A | | 12/2021 | | |
| CN | 215190801 U | | 12/2021 | | |
| CN | 216147770 U | | 4/2022 | | |
| CN | 216797267 U | * | 6/2022 | | A47G 27/0281 |
| CN | 217408417 U | * | 9/2022 | | |
| CN | 117414042 A | * | 1/2024 | | B32B 5/026 |
| CN | 222473590 U | * | 2/2025 | | |
| EP | 3177197 B1 | | 6/2021 | | |
| JP | H05269005 A | | 10/1993 | | |
| JP | 2012110571 A | | 6/2012 | | |
| WO | 2022088719 A1 | | 5/2022 | | |

* cited by examiner

DETACHABLE CARPET

CROSS REFERENCE TO THE RELATED APPLICATIONS

This application is the national phase entry of International Application No. PCT/CN2022/103555, filed on Jul. 4, 2022, which is based upon and claims priority to Chinese Patent Application No. 202221122673.0, filed on May 11, 2022, the entire contents of which are incorporated herein by reference.

TECHNICAL FIELD

The present invention relates to carpets in the textile industry, and particularly relates to a detachable carpet.

BACKGROUND

There are two design methods for standard bath mats and carpets at present. One method is to design a towel-like bath mat, but this ground mat is not anti-skid and has potential safety hazards. Another method is to bond a material with an anti-skid function to a back surface of the carpet, and it is asserted that this type of ground mat is washable, but it will become separated or damaged, or an upper fabric and a lower bottom back are separated once it is washed in a machine. Moreover, multi-applicability of the carpet is hindered due to tedious design and manufacture and high price of a conventional carpet. For example, a user typically cannot replace the carpet seasonally at will as needed. Therefore, a carpet is needed which not only has the functions of conventional carpet, but also facilitates the user to separate the surface material of the carpet from a liner layer with anti-skid and water-repellent functions so as to disassemble and wash the surface material of the carpet.

In the prior art, there is a composite carpet, which connects the carpet surface and the liner of the carpet by using a magic tape. The magic tape connects two layers of structures together with a secondary surface and a primary surface. One surface of the magic tape consists of fine and soft fiber loops (Loop) and the other surface is provided with hard hooks (Hook). The two are firmly combined and can be separated only with a large force, owing to a large tensile force to separate the carpet surface and the liner of the carpet with the magic tape, as far as the soft carpet is concerned, the carpet may be damaged due to a large action force, and it is inconvenient to detach. The hard surface of the magic tape will reduce the using comfort level of the carpet. Moreover, the magic tape or a gravel-shaped cushion has a great destructive effect to soft loop-pile cloth, and the connecting force is greatly reduced after multiple times of use.

Patent literature CN209932326U discloses an easily cleaned detachable carpet, including a base, where a groove for placing the carpet is dug in an upper surface of the base, cuboid limiting plates are welded and fixed to left and right sides of the groove, there are certain gaps between the limiting plates and the bottom of the groove, cuboid notches penetrating the limiting plates are dug in the limiting plates, cuboid pressure plate blocks are placed in the notches, one end of the pressure plate block is hinged and fixed with one end of the notch, the other end of the pressure plate block is provided with a bolt hole, a primary paste buckle is adhered and fixed to a bottom surface of the pressure plate block, a secondary paste buckle is adhered and fixed to the primary paste buckle, the secondary paste buckles are sewed on left and right sides of an upper surface of a bottom layer of the carpet, a cloth bag is sewed on the upper surface of the bottom layer, a zipper groove is dug in the side surface of the cloth bag, a zipper is mounted in the zipper groove, a bag core is placed in the cloth bag, an anti-skid layer is sewed above the cloth bag, and a suede layer of the carpet is sewed on the anti-skid layer. The prior art has the deficiency that by adopting a technical means of the paste buckle similarly, the paste buckle is easily damaged in the detaching and cleaning processes and deforms due to factors such as temperature, so that the service life of the carpet is affected severely.

In the prior art, a plurality of vertically downward protrusions are also additionally arranged below the carpet surface layer, the downward protrusions can be inserted into the mesh gaps of the three-dimensional mesh fabric structure layer on the carpet mat, and the carpet can be combined with the gap structures of the three-dimensional mesh fabric structure layer. However, stabs formed by the polyester, polypropylene or nylon monofilaments in the anti-skid mat layer may be inlaid into the mesh gaps of the three-dimensional mesh fabric structure layer after repeated used. The carpet is susceptible to deformation after long-term use, and hands are easily pricked in terms of hand feeling when it is separated from the lower layer, which brings people an uncomfortable feeling.

SUMMARY

To overcome the defects in the prior art, the present invention is intended to provide a detachable carpet.

The objective of the present invention can be achieved by the following technical solution:

the present invention provides a detachable carpet, the detachable carpet including a carpet surface layer and an adhesive anti-skid layer, where the carpet surface layer and the adhesive anti-skid layer are detachably connected;

the carpet surface layer includes a surface layer and a sticky layer, where the surface layer is arranged at a top end of the carpet surface layer; bent protruded monofilaments are distributed on a lower surface of the sticky layer, and lumps are formed at the tops of the monofilaments after the monofilaments are melted/softened; and the adhesive anti-skid layer includes a hooking surface layer and an anti-skid layer, where the anti-skid layer is arranged at a bottom of the adhesive anti-skid layer.

The protruded monofilaments are distributed on the lower surface of the sticky layer. After thermal treatment, the top ends of the protruded monofilaments are melted/softened to form small lumps. Meanwhile, the monofilaments subjected to thermal treatment have certain radian, inclination to form hooked spines which can be hooked with gaps of various adhesive anti-skid layers therebelow to gain a locking effect.

As an implementation mode of the present invention, the carpet surface layer further includes a bonding layer, the bonding layer being arranged between the surface layer and the sticky layer. The surface layer and the sticky layer are connected as a whole through the bonding layer.

As an implementation mode of the present invention, a supportive fabric bonding layer is placed between the surface layer and the sticky layer. The supportive layer of a fabric structure includes one of a nonwoven layer, a sponge layer, a knitted layer and a woven layer. The supportive layer of a fabric structure can improve the supporting property, the dimensional stability, the comfort and the smoothness of the carpet.

As an implementation mode of the present invention, the surface layer includes one of a surface layer of a velvet pile structure, a surface layer of a loop pile structure, a surface layer of a fleecy structure and a surface layer of a plain woven structure.

As an implementation mode of the present invention, the sticky layer includes one of a warp and weft woven layer, a layer of a woven structure, a layer of a tufting and cutting structure, a layer of a flocking structure, a layer of a fleecy structure and a layer of a fleecy nonwoven structure. Integrated protruded monofilaments are distributed on the surface of the sticky layer, are not easy to fall off and form lumps.

As an embodiment of the present invention, a height of the protruded monofilament is 0.5-10 mm. A thickness of the protruded monofilament is 18DTEX-10000DTEX. If the protruded monofilaments are too high, a displacement is generated under the action of an external force when the surface layer is hooked with the adhesive anti-skid layer. People walking on the carpet are easy to fall down. If the protruded monofilaments are too low, the protruded monofilaments cannot be hooked firmly when being combined with the surface layer.

As an embodiment of the present invention, the hooked surface layer includes one of a layer of a fleecy fabric structure, a layer of a woven fabric with mesh gap structures, a layer of a fabric structure with a plurality of gaps, a layer of a nonwoven structure and a layer of a flexible material structure with meshes in surface.

As an embodiment of the present invention, the anti-skid layer is made from one of a thermoplastic elastomer layer, an ethylene-vinyl acetate (EVA)/polyurethane (PU)/polyvinyl chloride (PVC)/styrene butadiene rubber (SBR)/cross-linked polyethylene (XPE) foamed material layer, a nonwoven fabric layer, a hot melt adhesive layer and a fabric layer with an anti-skid function.

As an implementation mode of the present invention, a supportive layer of a fabric structure is placed between the hooked surface layer and the anti-skid layer. The supportive layer of a fabric structure includes one of a nonwoven layer, a sponge layer, a knitted layer and a woven layer. The supportive layer of a fabric structure can improve the supporting property, the dimensional stability, the comfort and the smoothness of the carpet.

The hooked spines of the present invention are short and can be hooked, so that the monofilaments need not to excessively penetrate into the hooked surface layer. The adhesive anti-skid layer can be thinner, too. In the using process, the stressed carpet surface will oppress the carpet, so that the hooks formed by the protruded monofilaments enter the adhesive anti-skid layer. Compared with unbent monofilaments, the protruded monofilaments generate a better hooking effect. The protruded monofilaments are distributed on the back of the carpet surface, so that the carpet surface will not be damaged in the detaching process, and thus, the service life is long. Compared with a condition that the hooked spines are distributed on the upper surface of the adhesive anti-skid layer, it is suitable for an ultrathin carpet surface with different feelings of foot, particularly a domestic carpet. The protruded monofilaments will not pierce the carpet surface to affect the use feeling. When the carpet surface layer is replaced in a large area, the adhesive anti-skid layer as a base can be reserved as a carpet for facilitating subsequent pavement of the carpet surface layer. A condition that replacement of the carpet surface layer on the adhesive anti-skid layer is affected as the protrusions spreading all over the surface of the base prick the hand is avoided.

BRIEF DESCRIPTION OF THE DRAWINGS

By reading and referring to detailed description made by the following drawings to non-restrictive embodiments, other features, purposes and advantages of the present invention will become more obvious.

Figure 1:
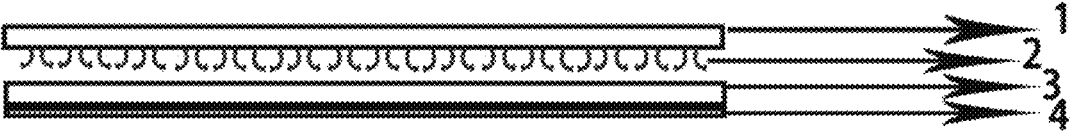
FIG. 1 is a schematic diagram of a detachable carpet in the embodiment 1 of the present invention.

In the drawings, 1—surface layer of plain woven structure; 2—sticky layer; 3—hooked surface layer; 4—anti-skid layer; 5—fabric bonding layer; 6—surface layer of loop pile structure; 7—surface layer of velvet pile structure.

DETAILED DESCRIPTION OF THE EMBODIMENTS

The present invention will be described in detail below in combination with drawings and specific embodiments. The examples below are implemented on the premise of the technical solution of the present invention with specific implementation modes and specific operation processes provided, which is beneficial for those skilled in the art to further understand the present invention. It is to be pointed out that the protection scope of the present invention is not limited to the embodiments below, and several adjustments and improvements made on the premise of the concept of the present invention shall fall into the protection scope of the present invention.

Embodiment 1

An embodiment of the present invention provides a detachable carpet, including a carpet surface layer and an adhesive anti-skid layer, where the carpet surface layer is detachably connected to the adhesive anti-skid layer.

As shown in FIG. 1, the carpet surface layer includes a surface layer 1 of a plain woven structure, a sticky layer 2, a hooked surface layer 3 and an anti-skid layer 4. The surface layer 1 of a plain woven structure is arranged at a top end of the carpet surface layer, and the hooked surface layer 3 is adhered to a top end of the anti-skid layer 4.

The sticky layer 2 is a warp and weft woven layer, the anti-skid layer 4 is a TPE layer, and the hooked surface layer 3 is a layer of a fleecy fabric structure. The layer of a fleecy fabric structure forms the TPE layer through a film spraying process.

The warp and weft woven layer (the sticky layer 2) is 2 mm thick; there are a plurality of 5000D protruded monofilaments on the lower surface of the warp and weft woven layer; subjected to thermal treatment, the top ends of the protruded monofilaments are melted/softened to form small lumps. Meanwhile, the protruded monofilaments subjected to thermal treatment have certain radian and inclination to form hooked spines 2-3 mm high. The downward hooked spines can be hooked with the layer of a fleecy fabric structure (the hooked surface layer 3) to form the detachable carpet.

Embodiment 2

An embodiment of the present invention provides a detachable carpet, including a carpet surface layer and an adhesive anti-skid layer, where the carpet surface layer is detachably connected to the adhesive anti-skid layer.

Figure 2:
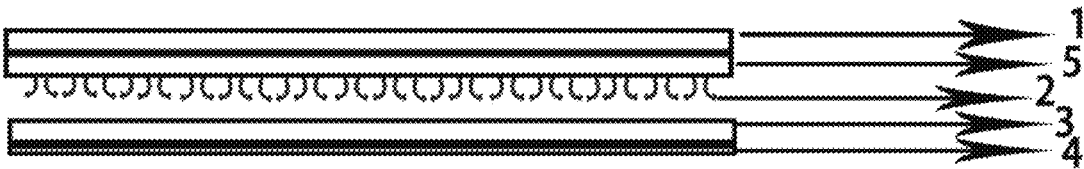
FIG. 2 is a schematic diagram of a detachable carpet in the embodiment 2 of the present invention.

As shown in FIG. 2, the carpet surface layer includes a surface layer 1 of a plain woven structure, a sticky layer 2, and a fabric bonding layer 5. The surface layer 1 of a plain woven structure is connected to the fabric bonding layer 5 through adhesive glue and then the fabric bonding layer 5 and the sticky layer 2 are adhered through adhesive glue. The adhesive anti-skid layer includes a hooked surface layer 3 and an anti-skid layer 4. The surface layer 1 of a plain woven structure is arranged at a top end of the carpet surface layer, and the hooked surface layer 3 is adhered to a top end of the anti-skid layer 4.

The sticky layer 2 is a warp and weft woven layer, the fabric bonding layer 5 is a nonwoven fabric, the anti-skid layer 4 is a foamed latex anti-skid layer, and the hooked surface layer 3 is a layer of a fleecy fabric structure. The layer of a fleecy fabric structure forms the foamed latex layer through a film spraying process.

The warp and weft woven layer (the sticky layer 2) is 2 mm thick; there are a plurality of 6000D protruded monofilaments on the lower surface of the warp and weft woven layer; subjected to thermal treatment, the top ends of the protruded monofilaments are melted/softened to form small lumps. Meanwhile, the protruded monofilaments subjected to thermal treatment have certain radian and inclination to form hooked spines 3-4 mm high. The downward hooked spines can be hooked with the layer of a fleecy fabric structure (the hooked surface layer 3) to form the detachable carpet.

Embodiment 3

An embodiment of the present invention provides a detachable carpet, including a carpet surface layer and an adhesive anti-skid layer, where the carpet surface layer is detachably connected to the adhesive anti-skid layer.

Figure 3:
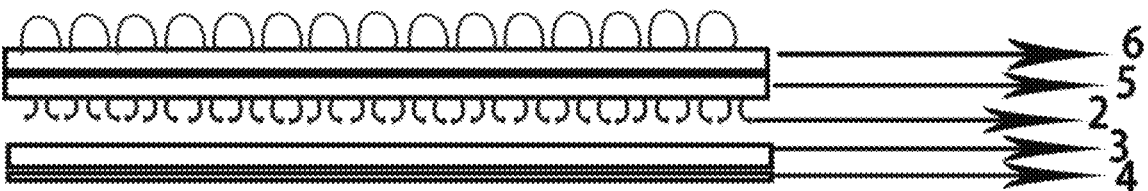
FIG. 3 is a schematic diagram of a detachable carpet in the embodiment 3 of the present invention.

As shown in FIG. 3, the carpet surface layer includes a surface layer of loop pile structure 6, a sticky layer 2, and a fabric bonding layer 5. The surface layer of loop pile structure 6 is connected to the fabric bonding layer 5 through adhesive glue and then the fabric bonding layer 5 and the sticky layer 2 are adhered through adhesive glue. The adhesive anti-skid layer includes a hooked surface layer 3 and an anti-skid layer 4. The surface layer 1 of a plain woven structure is arranged at a top end of the carpet surface layer, and the hooked surface layer 3 is adhered to a top end of the anti-skid layer 4.

The sticky layer 2 is a warp and weft woven layer, the fabric bonding layer 5 is a fabric of a woven meshed structure, the anti-skid layer 4 is a TPE anti-skid layer, and the hooked surface layer 3 is a layer of a three-dimensional meshed fabric structure. The layer of a fleecy fabric structure forms the TPE layer through a film spraying process.

The warp and weft woven layer (the sticky layer 2) is 3 mm thick; there are a plurality of 8000D protruded mono-filaments on the lower surface of the warp and weft woven layer; subjected to thermal treatment, the top ends of the protruded monofilaments are melted/softened to form small lumps. Meanwhile, the protruded monofilaments subjected to thermal treatment have certain radian and inclination to form hooked spines 4-5 mm high. The downward hooked spines can be hooked with the layer of a three-dimensional meshed fabric structure (the hooked surface layer 3) to form the detachable carpet.

Embodiment 4

An embodiment of the present invention provides a detachable carpet, including a carpet surface layer and an adhesive anti-skid layer, where the carpet surface layer is detachably connected to the adhesive anti-skid layer.

Figure 4:
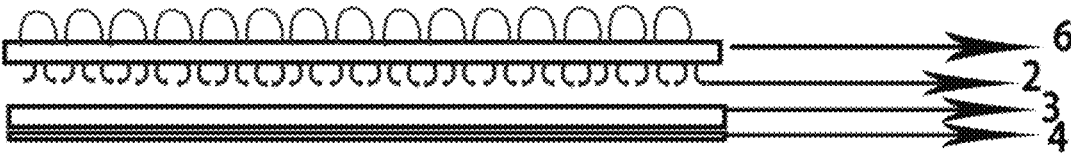
FIG. 4 is a schematic diagram of a detachable carpet in the embodiment 4 of the present invention.

As shown in FIG. 4, the carpet surface layer includes a surface layer of loop pile structure 6 and a sticky layer 2, and the adhesive anti-skid layer includes a hooked surface layer 3 and an anti-skid layer 4. The surface layer of a loop pile structure 6 is arranged at a top end of the carpet surface layer, and the hooked surface layer 3 is adhered to a top end of the anti-skid layer 4.

The sticky layer 2 is a flocked fabric layer, the anti-skid layer 4 is a TPE layer, and the hooked surface layer 3 is a layer of a fleecy nonwoven fabric structure. The layer of a fleecy nonwoven fabric structure forms the TPE layer through a film spraying process.

The flocked fabric layer (the sticky layer 2) is 2 mm thick; there are a plurality of 6500D protruded monofilaments on the lower surface of the warp and weft woven layer; subjected to thermal treatment, the top ends of the protruded monofilaments are melted/softened to form small lumps. Meanwhile, the protruded monofilaments subjected to thermal treatment have certain radian and inclination to form hooked spines 2-3 mm high. The downward hooked spines can be hooked with the layer of a fleecy nonwoven fabric structure (the hooked surface layer 3) to form the detachable carpet.

Embodiment 5

An embodiment of the present invention provides a detachable carpet, including a carpet surface layer and an adhesive anti-skid layer, where the carpet surface layer is detachably connected to the adhesive anti-skid layer.

Figure 5:
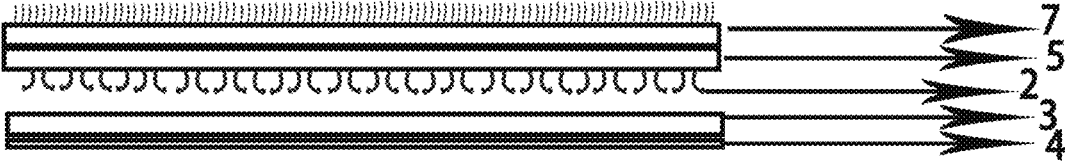
FIG. 5 is a schematic diagram of a detachable carpet in the embodiment 5 of the present invention.

As shown in FIG. 5, the carpet surface layer includes a surface layer of a velvet pile structure 7, a sticky layer 2 and a fabric bonding layer 5, and the adhesive anti-skid layer includes a hooked surface layer 3 and an anti-skid layer 4. The surface layer of a velvet pile structure 7 is arranged at a top end of the carpet surface layer, and the hooked surface layer 3 is adhered to a top end of the anti-skid layer 4.

The sticky layer 2 is a warp and weft woven layer, the anti-skid layer 4 is a PVC layer, and the hooked surface layer 3 is a layer of a fleecy fabric structure. The layer of a fleecy nonwoven fabric structure forms the PVC anti-skid layer through a film spraying process.

The warp woven layer (the sticky layer 2) is 3 mm thick; there are a plurality of 10000D protruded monofilaments on the lower surface of the warp and weft woven layer; subjected to thermal treatment, the top ends of the protruded monofilaments are melted/softened to form small lumps. Meanwhile, the protruded monofilaments subjected to thermal treatment have certain radian and inclination to form hooked spines 12-15 mm high. The downward hooked spines can be hooked with the layer of a fleecy nonwoven fabric structure (the hooked surface layer 3) to form the detachable carpet.

Figure 6:
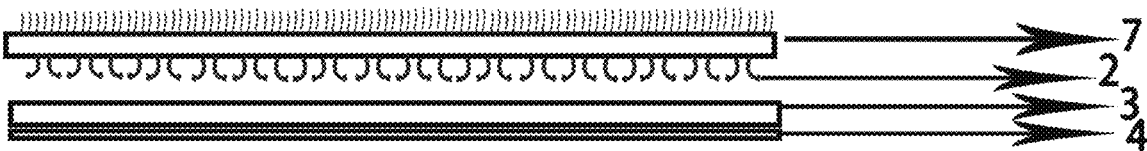
FIG. 6 is a schematic diagram of a detachable carpet in the embodiment 6 of the present invention.

As shown in FIG. 6, the carpet surface layer includes a surface layer of a velvet pile structure 7 and a sticky layer 2. The surface layer of a velvet pile structure 7 is connected to the fabric bonding layer 5 through adhesive glue and then the fabric bonding layer 5 and the sticky layer 2 are adhered through adhesive glue. The adhesive anti-skid layer includes a hooked surface layer 3 and an anti-skid layer 4. The surface layer 1 of a plain woven structure is arranged at a top end of the carpet surface layer, and the hooked surface layer 3 is adhered to a top end of the anti-skid layer 4.

The sticky layer 2 is a warp woven layer, the fabric bonding layer 5 is a sponge layer, the anti-skid layer 4 is a TPE layer, and the hooked surface layer 3 is a layer of a fleecy fabric structure. The layer of a fleecy fabric structure forms the TPE layer through a film spraying process.

The warp woven layer (the sticky layer 2) is 4 mm thick; there are a plurality of 8000D protruded monofilaments on the lower surface of the warp and weft woven layer; subjected to thermal treatment, the top ends of the protruded monofilaments are melted/softened to form small lumps. Meanwhile, the protruded monofilaments subjected to thermal treatment have certain radian and inclination to form hooked spines 2-3 mm high. The downward hooked spines can be hooked with the layer of a fleecy fabric structure (the hooked surface layer 3) to form the detachable carpet.

Compared with the prior art, one or more embodiments of the present invention have the following beneficial effects:

1. The protruded monofilaments and suede are bent at a high temperature, so that they form a hooking effect with a water-repellent anti-skid layer therebelow, and thus, the carpet features better bonding force, higher frictional force and firmness;

2. They are melted and fixed at the high temperature, so that the monofilaments and fibers of the sticky layer are not easy to fall off;

3. The monofilaments of the sticky layer have certain bending deflection and the small bumps of piles are passivated on surface, so that hands of a user are prevented from being hurt due to carelessness, and meanwhile, the locking effect with the water-repellent anti-skid layer therebelow is enhanced.

Specific embodiments of the present invention are described above. It is to be understood that the present invention is not limited to the specific embodiments, and those skilled in the art can made various variations or modifications within the scope of the claims without affecting the substantial contents of the present invention.

What is claimed is:

1. A detachable carpet, comprising a carpet surface layer and an adhesive anti-skid layer, wherein the carpet surface layer and the adhesive anti-skid layer are detachably connected;

the carpet surface layer comprises a surface layer and a sticky layer, wherein the surface layer is arranged at a top end of the carpet surface layer; bent protruded monofilaments are distributed on a lower surface of the sticky layer, and lumps are formed at tops of the bent protruded monofilaments after the bent protruded monofilaments are melted/softened, wherein the bent protruded monofilaments both are bent to form a J-structure and include the lumps at curved ends of the J-structure; and the adhesive anti-skid layer comprises a hooking surface layer and an anti-skid layer, wherein the anti-skid layer is arranged at a bottom of the adhesive anti-skid layer.

2. The detachable carpet according to claim 1, wherein a supportive fabric bonding layer is placed between the surface layer and the sticky layer.

3. The detachable carpet according to claim 1, wherein the surface layer comprises one of a surface layer of a velvet pile structure, a surface layer of a loop pile structure, a surface layer of a fleecy structure, and a surface layer of a plain woven structure.

4. The detachable carpet according to claim 1, wherein the sticky layer comprises one of a warp and weft woven layer, a layer of a woven structure, a layer of a tufting and cutting structure, a layer of a flocking structure, a layer of a fleecy structure, and a layer of a fleecy nonwoven structure.

5. The detachable carpet according to claim 1, wherein a height of each of the bent protruded monofilaments is 0.5 mm-10 mm.

6. The detachable carpet according to claim 1, wherein a thickness of each of the bent protruded monofilaments is 18DTEX-10000DTEX.

7. The detachable carpet according to claim 1, wherein the hooking surface layer comprises one of a layer of a fleecy fabric structure, a layer of a woven fabric with mesh gap structures, a layer of a fabric structure with a plurality of gaps, a layer of a nonwoven structure, and a layer of a flexible material structure with meshes in a surface.

8. The detachable carpet according to claim 1, wherein the anti-skid layer is made from one of a thermoplastic elastomer layer, an ethylene-vinyl acetate (EVA)/polyurethane (PU)/polyvinyl chloride (PVC)/styrene butadiene rubber (SBR)/cross-linked polyethylene (XPE) foamed material layer, a nonwoven fabric layer, a hot melt adhesive layer, and a fabric layer with an anti-skid function.

9. The detachable carpet according to claim 1, wherein a supportive layer of a fabric structure is placed between the hooking surface layer and the anti-skid layer.

10. The detachable carpet according to claim 1, wherein the carpet surface layer further comprises a bonding layer arranged between the surface layer and the sticky layer.

* * * * *